H. B. MARTIN.
Surveyor's Compass.

No. 43,036.

Patented June 7, 1864.

Witnesses:

Inventor.
H. B. Martin

UNITED STATES PATENT OFFICE.

HORACE B. MARTIN, OF SANTA ROSA, CALIFORNIA.

IMPROVEMENT IN SURVEYORS' COMPASSES.

Specification forming part of Letters Patent No. 43,036, dated June 7, 1864.

*To all whom it may concern:*

Be it known that I, HORACE B. MARTIN, of Santa Rosa, in the county of Sonoma and State of California, have invented a new and useful Improvement on Surveying-Instruments, being a true-meridian plate to enable the surveyor to read his true meridian course at once from the needle, and at the same time preserve his magnetic bearings; and I do hereby declare that the following is a full, clear, and exact description of the construction and operation of the same, reference being had to the annexed drawings, making a part of this specification, in which—

Figure 1:
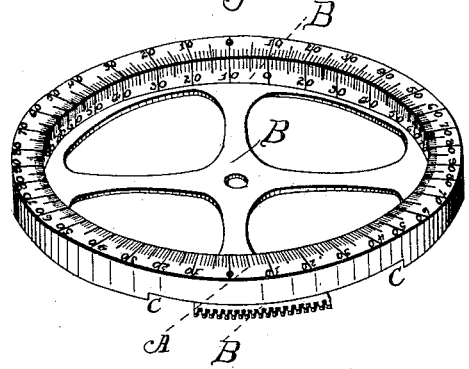
Figure 2:
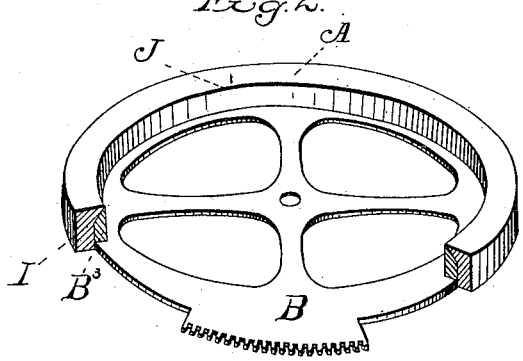
Figure 4:
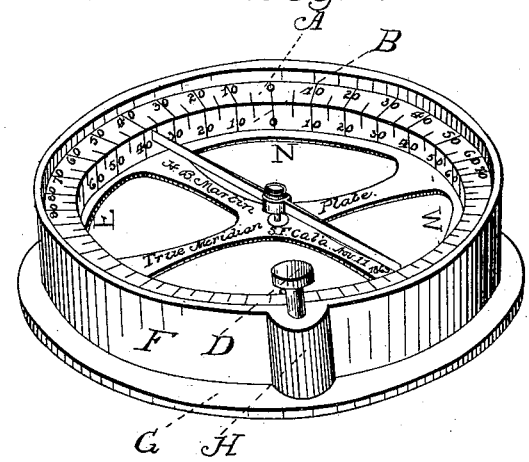
Figure 3:
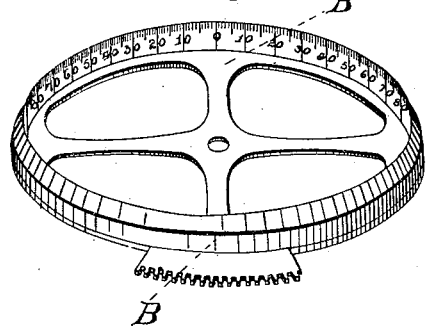

Figure 1 represents the graduated ring A common to all surveying-instruments, with the true-meridian plate B inserted, each graduated to degrees. Fig. 2 represents the common graduated ring A with the true-meridian plate B inserted, with a section removed to show the mode of inserting the plate B. Fig. 3 represents a perspective view of the true-meridian plate B, graduated to degrees, disconnected from the other parts of the instrument. Fig. 4 is a perspective view of, first, the compass-box F, differing from others only in the projection H to receive the key D, which connects with a small pinion that revolves the plate B; second, the common ring A, graduated to five degrees; third, the true-meridian plate B, inserted, graduated the same; fourth, the magnetic needle, with one end slightly depressed to enable the surveyor the more readily to read the lower graduation; fifth, the bed-plate G.

The improvement aforesaid consists of the movable graduated plate B, constructed, inserted, and operated as follows: I take the ordinary graduated ring A and turn out a recess, as shown at cross-section I, Fig. 2, beveling it to a fine edge at its upper and inner angle at the joint J. Then cut out slot C to receive the projection on the plate B. Then construct a ring with a bevel from the outside to a fine edge at its upper and inner angle. (See B³, Fig. 2.) This is set on a circular plate of equal diameter with the ring, the plate having a projection with gear cut in its exterior arc to receive a pinion, by which the key D gives it a rotary motion. (See Fig. 3.) The ring on plate B being fitted in the recess in ring A, with projection in slot C, with a center stud on which to revolve, I graduate the ring B the same as ring A. The parts being in their proper connection, (see Fig. 4,) the horizontal and perpendicular zero at the same point, it is adjusted for use as follows: Suppose the magnetic variation is ten degrees east. Turn the key D until it revolves the plate B ten degrees to the right, or until 0 on plate B corresponds with 10 on plate A. (See Fig. 1.) Then the needle will track to the true-meridian courses on plate B and to the magnetic courses on plate A, thus saving time and preventing the liability of mistake in calculating the true course from the magnetic, while the vernier plate or plates are left free and independent, giving three separate graduations, thereby rendering the instrument more simple and convenient.

I am aware that there are means known and in use for laying off the variation by rotating the compass-box entire, and that the same thing can be effected with some transits on their verniers, but then the use of the vernier-plate is lost as well as the magnetic readings, and the surveyor must readjust his instrument to the variation every time he uses his vernier.

I claim—

The movable graduated plate B, as shown substantially in Fig. 3, acting within the compass-box, and connecting with the graduation of the stationary ring, so that the two graduations shall meet precisely at the end of the needle, the whole arranged substantially as and for the purposes set forth.

H. B. MARTIN.

Witnesses:
J. B. SOUTHARD,
W. A. ELIASON.